Jan. 5, 1965         C. E. WORKMAN            3,164,488
PROCESS FOR BONDING POLYESTER COATINGS TO METAL
     SUBSTRATES USING A CURED EPOXY PRIMER
          AND PRODUCT OBTAINED THEREBY
               Filed Feb. 15, 1962
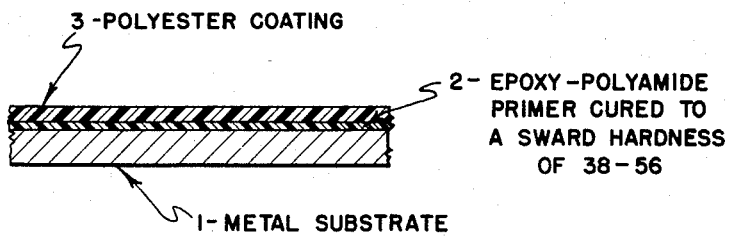
3 - POLYESTER COATING
2 - EPOXY - POLYAMIDE
PRIMER CURED TO
A SWARD HARDNESS
OF 38-56
1 - METAL SUBSTRATE
INVENTOR.
CLAYTON E. WORKMAN
BY
AGENT

United States Patent Office 3,164,488
Patented Jan. 5, 1965

3,164,488
PROCESS FOR BONDING POLYESTER COATINGS TO METAL SUBSTRATES USING A CURED EPOXY PRIMER AND PRODUCT OBTAINED THEREBY
Clayton E. Workman, Kankakee, Ill., assignor to General Mills, Inc., a corporation of Delaware
Filed Feb. 15, 1962, Ser. No. 173,527
11 Claims. (Cl. 117—75)

This invention relates to a method of bonding a polyester coating to a metal substrate. More particularly, it relates to the method of bonding a polyester coating to a metal substrate by first applying a certain epoxy primer to said substrate, curing said primer to a specific hardness and then over-coating the epoxy primer with said polyester. The invention also includes the articles coated by the above method.

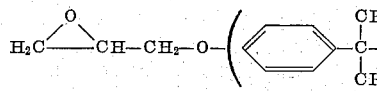 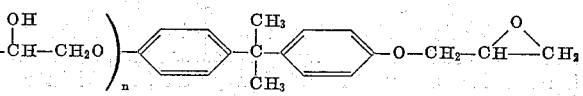

Polyester coatings are very desirable because of their durability and other properties. However, it is well known that polyesters in general do not have good adhesion to metal substrates. Various methods of overcoming this problem have been suggested in the art. One of such methods is the use of a primer coating which is then over-coated with the polyester. In order for this procedure to be successful, the primer coating must have good adhesion to both the metal subtrate and the polyester coating.

Epoxy resins cured with polyamides derived from polymeric fat acids are known to have good adhesion to a wide variety of substrates including metals. Thus it was thought that said resins would be suitable for use as the primer coating for the metal substrate upon which the polyesters could be over-coated. However, it was found that when said epoxy-polyamide primers were completely cured on the metal substrate, the primer showed excellent adhesion to the substrate but very poor adhesion to the over-coated polyester. It was also found that when said epoxy-polyamide primers were cured only to a wet or tacky state on the subtrate, the primers exhibited incompatibility with the polyester and neither the primer nor polyester would cure.

It is an object of the present invention to provide a method of bonding a polyester to a metal substrate. A further object of the invention is to provide such a method using a certain epoxy primer which has been cured to a specific hardness. Another object is to provide such a method using an epoxy resin cured with polyamides derived from polymeric fat acids. It is also an object of my invention to provide metal articles which are coated with said epoxy primers and polyesters. These and other objects will become apparent from the following detailed description of the invention taken in conjunction with the attached single figure of drawings, in which the figure represents an enlarged vertical sectional view of a portion of a partly-finished article which has been coated with the coating system of the invention. A metal substrate 1 is coated with an epoxy-polyamide priming coat 2 which is cured to a specific hardness and then with a polyester coating 3.

I have discovered that polyesters can be bonded to metal substrates by first coating the substrate with an epoxy-polyamide primer, curing said primer to a Sward Hardness of 38–56 and then over-coating the primer with the polyester. It was unexpected to find that the epoxy-polyamide primer must be cured only to a specific hardness range in order to have good adhesion to both the metal substrate and the polyester coating.

As indicated above, the primer is an epoxy-resin-polyamide system. Both solid and liquid epoxy resins can be employed. Suitable resins include the reaction products of polyhydric phenols with polyfunctional halohydrins. Typical polyhydric phenols useful in the preparation of such resins include resorcinol and various bisphenols resulting from the condensation of phenol with aldehydes and ketones such as formaldehyde, acetaldehyde, acetone, methyl ethyl ketone and the like. A typical epoxy resin of this type is the reaction product of epichlorohydrin and 2,2-bis(p-hydroxyphenyl) propane (hereinafter referred to as Bisphenol A), the resin having the following theoretical structural formula:

where $n$ is 0 or an integer up to 10. Generally speaking, $n$ will be no greater than 3 or 4, and is preferably 3 or less. However, other types of epoxy resins may be employed.

Another of such epoxy resins are those which are the reaction product of epichlorohydrin and bis(p-hydroxyphenyl) sulfone. Still another group of epoxy compounds which may be employed are the glycidyl esters of the polymeric fat acids. These glycidyl esters are obtained by reacting the polymeric fat acids with polyfunctional halohydrins such as epichlorohydrin. In addition, the glycidyl esters are also commercially available epoxide materials. As the polymeric fat acids are composed largely of dimeric acids, the glycidyl esters thereof may be represented by the following theoretical idealized formula:

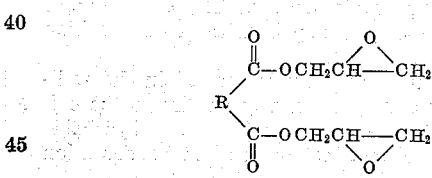

where R is the divalent hydrocarbon radical of dimerized unsaturated fatty acids. Suitable polymeric fat acids are described hereinafter with respect to the polyamide description.

Other types of epoxy resins which may be used in the primers according to the present invention and which are commercially available epoxy materials are the polyglycidly ethers of tetraphenols which have two hydroxy aryl groups at each end of an aliphatic hydrocarbon chain. These polyglycidyl ethers are obtained by reacting the tetraphenols with polyfunctional halohydrins such as epichlorohydrin. The tetraphenols used in preparing the polyglycidyl ethers are a known class of compounds readily obtained by condensing the appropriate dialdehyde with the desired phenol. Typical tetraphenols useful in the preparation of these epoxy resins are the alpha,alpha,omega,omega - tetrakis(hydroxyphenyl) alkanes, such as 1,1,2,2-tetrakis(hydroxyphenyl) ethane, 1,1,4,4-tetrakis(hydroxyphenyl) butane, 1,1,4,4-tetrakis-(hydroxyphenyl)-2-ethylbutane and the like. The epoxy resin reaction product of epichlorohydrin and tetraphenol may be represented by the following theoretical structural formula:

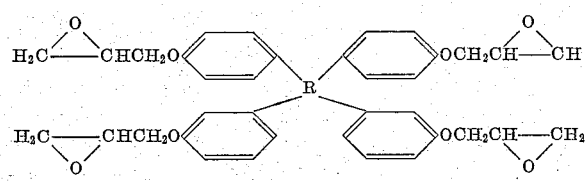

where R is a tetravalent aliphatic hydrocarbon chain having from 2 to 10, and preferably, from 2 to 6 carbon atoms.

Still another group of epoxide materials are the epoxidized novolac resins. Such resins are well known substances and readily available commercially. The resins may be represented by the following idealized formula:

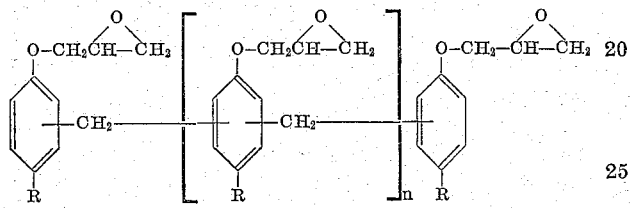

where R is selected from the group consisting of hydrogen and alkyl groups having up to 18 carbon atoms, and $n$ is an integer of from 1 to 5. In general, $n$ will be an integer in excess of 1 to about 3.

In general, these resins are obtained by epoxidation of the well-known novolac resins. The novolac resins, as is known in the art, are produced by condensing the phenol with an aldehyde in the presence of an acid catalyst. Although novolac resins from formaldehyde are generally employed, novolac resins from other aldehydes such as for example, acetaldehyde, chloral, butyraldehyde, furfural, and the like, may also be used. The alkyl group, if present, may have a straight or a branched chain. Illustrative of the alkyl-phenol from which the novolac resins may be derived are cresol, butylphenol, tertiary butylphenol, tertiary amylphenol, hexylphenol, 2-ethyl hexylphenol, nonylphenol, decylphenol, dodecylphenol, and the like. It is generally preferred, but not essential, that the alkyl substituent be linked to the para carbon atom of the parent phenolic nucleus. However, novolac resins in which the alkyl group is in the ortho position have been prepared.

The epoxidized novolac resin is formed in the well-known manner by adding the novolac resins to the epichlorohydrin and then adding an alkali metal hydroxide to the mixture so as to effect the desired condensation reaction.

In addition, other epoxy resins which may be used are epoxidized olefins, such as epoxidized polybutadiene and epoxidized cyclohexanes, and the diglycidyl ethers of polyalkylene glycols.

In general, the epoxy resins may be described as those having terminal epoxide groups.

In addition, the epoxy resins may be characterized further by reference to their epoxy equivalent weight, the epoxy equivalent weight of pure epoxy resin being the mean molecular weight of the resins divided by the mean number of epoxy radicals per molecule, or in any case, the number of grams of epoxy resin equivalent to one epoxy group or one gram equivalent of epoxide. The epoxy resinous materials employed in this invention have epoxy equivalent weights of from about 140 to about 2,000.

The polyamides which may be used in combination with the epoxy resins are, in general, those derived from polymeric fat acids containing at least two carboxyl groups and aliphatic polyamines. Resins of this general type are disclosed in Cowan et al. Patent 2,450,940. Typical of these polyamides are those made with polymeric fat acids and ethylene diamine and/or diethylene triamine. It is possible to produce resins having terminal amine groups or terminal carboxyl groups, or in which some of the terminal groups are amine groups while others are carboxyl groups. Since both amine groups and carboxyl groups are useful in curing the epoxy resins, it will be apparent that a wide variety of these polyamides are useful for that purpose.

Alkylene polyamines which may be used to prepare the polyamides can be defined generally by the following structural formula, $H_2NR(NHR)_nNH_2$, where R is an alkylene radical and $n$ is an integer from 0 to 6. Illustrative of such polyamines are ethylene diamine, hexamethylene diamine, diethylene triamine, triethylene tetramine, and the like.

A wide variety of polymeric fat acids can be used to prepare the polyamides. The term "polymeric fat acid" refers to a polymerized fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. These acids are generally polymerized by somewhat different techniques, but because of the functional similarity of the polymerization products, they are generally referred to as "polymeric fat acids." The polymeric fat acids usually contain a predominant portion of dimerized fat acids, a small quantity of trimerized and higher polymeric fat acids and some residual monomers.

Saturated fat acids are difficult to polymerize, but polymerization can be obtained at elevated temperatures with a peroxidic catalyst such as di-t-butyl peroxide. Because of the low yields of polymeric products, these materials are not commercially significant. Suitable saturated fat acids include branched and straight chain acids such as caprylic, pelargonic, capric, lauric, myristic, palmitic, isopalmitic, stearic, arachidic, behenic and lignoceric.

The ethylenically unsaturated fat acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride, and other Lewis acids, anthraquinone, sulfur dioxide and the like. Suitable monomers include branched or straight chain, mono- and polyethylenically unsaturated acids such as 3-octenoic, 11-dodecenoic, linderic, lauroleic, myristoleic, tsuzuic, palmitoleic, petroselinic, oleic, elaidic, vaccenic, gadoleic, cetoleic, nervonic, linoleic, linolenic, eleostearic, hiragonic, moroctic, timnodonic, eicosatetraenoic, nisinic, scoliodonic, and chaulmoogric.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono- and polyunsaturated, are useful monomers for the preparation of the polymeric fat acids. Suitable examples of such materials include 10-undecanoic acid, tariric acid, stearolic acid, behenolic acid and isamic acid.

Although any one of the above-described saturated ethylenically unsaturated and acetylenically unsaturated fat acids may be used to prepare the polymeric fat acids, it is generally the practice in the art to polymerize mixtures of acids (or the simple aliphatic alcohol esters—i.e., the methyl esters) derived from the naturally occurring drying and semi-drying oils. Suitable drying or semi-drying oils include soybean, linseed, tall, tung, perilla, oiticia, cottonseed, corn, sunflower, safflower, dehydrated castor oil and the like. Also, the most readily available naturally occurring polyunsaturated acid available in large quantities is linoleic acid. Accordingly, it should be appreciated that polymeric fat acids will, as a practical matter, result from fatty acid mixtures that contain a substantial amount of linoleic acid. In addition, polymeric fat acids are readily available commercial products.

The amidation reaction may be carried out under the usual conditions employed for this purpose. Polyamides of this type generally have molecular weights varying from 1,000 to 10,000. The melting points vary, depending upon the reactants and the reaction conditions. Where aliphatic diamines, such as ethylene diamine, are employed for the preparation of the polyamide, the resin may melt within the approximate range of about 100–120° C. and usually within the range of 100–105° C. Higher melting polyamide resins, for example melting within the range of 130–215° C., may be made by employing a mixture of polymeric fat acids and other polybasic acids, the latter having at least two carboxyl groups which are separated by at least 3 and not more than 8 carbon atoms. Typical of these polybasic acids are the aliphatic acids, glutaric, adipic, pimelic, and sebacic; and the aromatic acids, terephthalic and isophthalic acids. Low melting polyamide resins, melting within the approximate range of about 10–90° C., may be prepared from polymeric fat acids and aliphatic polyamines having at least 3 atoms intervening between the amine groups principally involved in the amidation reaction. Typical of such polyamines are diethylene triamine, 1,3-di-aminobutane, hexamethylene diamine and the like.

There is a wide variation in the relative proportions of the polyamide resin and the epoxy resin which may be employed to produce the primer coating. The polyamide may be considered as the curing agent for the epoxy resin when the polyamide is employed as the minor constituent. At the same time the polyamide may be employed as the major constituent with a minor amount of epoxy resin in which it may be considered that the epoxy resin serves to cure the polyamide. Compositions varying from 10% by weight epoxy resin and 90% by weight of polyamide resin to 90% epoxy resin and 10% polyamide resin are suitable. Since the epoxy resin may vary in the content of epoxy groups and since the polyamides may vary in proportion of excess amine and carboxyl groups, it is apparent that the properties which are obtained depend upon the relative proportions of the various functional groups present. In general, the free amine or carboxyl groups should be present in an amount equivalent to at least one-quarter of the epoxy groups. Similarly, the epoxy groups should be present in a quantity which is equivalent to at least one-quarter of either the free amine or carboxyl groups.

The epoxy resin-polyamide primer systems are ordinarily applied to the metal substrates from a solvent. Solvent solutions can be prepared by dissolving each constituent separately. The polyamides are soluble in aromatic hydrocarbons such as toluene or xylene, admixed with aliphatic alcohols, such as isopropanol, n-butanol, and the like. The epoxy resins are soluble in a mixture of a ketone, alcohol or alkyl ethers (i.e., the Cellosolves) and an aromatic hydrocarbon such as toluene or xylene. Solventless coatings can also be used and are prepared from the polyamides and fluid epoxy resins. The primers can be applied by known procedures, such as by spraying, dipping, brushing, roll coating or knife coating.

After the epoxy-polyamide primer is applied to the metal substrate, it is cured to a Sward Hardness of 38–56 by any suitable means. Thus the primers may be cured at room temperature for a few hours to several days, or the curing may be accelerated by the use of temperatures in the range of 80–200° C. All that is necessary is that the hardness of the primer coating be within the above range before application of the polyester coating. It is also a common practice to allow for an "induction" period or pre-polymer formation by letting about 15 minutes to one hour elapse between blending of the epoxy resin and polyamide and application thereof to the metal substrate.

The preparation of the polyamide resin, blends thereof with epoxy resins and production of coatings from such blends is further described in Renfrew et al. Patent No. 2,705,223.

After the above-described primer has been applied to the metal substrate and cured to the designated hardness, a polyester coating is applied to the primed substrate. Suitable polyesters are the polymerizable ethylenically unsaturated polyesters prepared from ethylenically unsaturated polycarboxylic acids and polyhydric alcohols. The polyesters are prepared by heating the polyhydric alcohols and the polybasic acids under esterification conditions until the acid value of the reaction mixture is about 5 to 100, and preferably about 10–50. The reaction mixture is heated until the mixture reaches reaction temperature at which water vapor is evolved. The temperature is then slowly increased until the desired reaction temperature is reached. The reaction temperature is then maintained until the desired acid number is attained. Generally, reaction times of 5 to 50 hours are sufficient at temperatures in the range of 180 to 250° C.

The preferred ethylenically unsaturated acids are the alpha-beta ethylenically unsaturated alpha-beta dicarboxylic acids. Of this group, maleic acid and fumaric acid are the preferred acids. Specific examples of other useful acids include aconitic, mesaconic, citraconic, ethyl maleic pyrocinchoninic, xeronic, and itaconic.

In addition, it is preferred to employ as part of the acid component, a dicarboxylic acid which is not ethylenically unsaturated. The preferred acid in this group is phthalic acid. Other suitable acids include isophthalic, tetrachlorophthalic, succinic, adipic, sebacic, suberic, azelaic, dimethylsuccinic, tetrahydrophthalic, bromomaleic and chlorofumaric.

Where the acid forms an anhydride, the acid anhydrides can be employed. Thus, as used herein, the term "acid" includes the anhydride form.

If desired, a small amount of drying oil acids may be used in the polyesters. The preferred such acids are linoleic and oleic. Generally, these acids are added as the component in a mixture of acids derived from naturally occurring vegetable oils and fats or from naturally occurring animal oils and fats. The preferred fatty acid mixtures are these derived from soybean oil, linseed oil, tung oil and oiticia oil.

The preferred polyhydric alcohols are the low molecular weight dihydric alcohols such as ethylene glycol and propylene glycol. Specific examples of other suitable polyhydric alcohols are polyalkylene glycols, such as diethylene glycol, triethylene glycol, and tripropylene glycol, butylene glycol, sorbitol, neopentyl glycol, pentaerythritol and glycerol. The polyhydric alcohol is used in an amount equivalent to or in slight excess of the total acid content.

A copolymerizable ethylenically unsaturated compound can be used in combination with the polymerizable unsaturated polyesters. Generally, these materials contain terminal ethylenic unsaturation which is characterized by the $CH_2=CH-$ group. The preferred ethylenically unsaturated monomer is styrene. Examples of other suitable alpha-beta ethylenically unsaturated monomers include alpha-methyl styrene, p-methyl styrene, divinyl benzene, indene, vinyl acetate, methyl methacrylate, methyl acrylate, allyl acetate, diallyl phthalate, diallyl succinate, diallyl adipate, diallyl sebacate, triallyl phosphate, and triallyl cyanurate. Generally, the alpha-beta unsaturated monomer is incorporated in the polymerizable unsaturated polyester in the amount of 10 to 80% by weight, based on the total composition. Amounts in the range of 20 to 60% by weight of the monomer, based on the total composition, are preferred.

The more reactive of the above-described ethylenically unsaturated compounds such as styrene, vinyl toluene and the like will react with the unsaturated polyesters at room temperature in the absence of a polymerization catalyst. Therefore, the monomer and polyester can be mixed just prior to application as a coating or they may be mixed with addition of a small amount of a suitable polymerization inhibitor. Examples of such inhibitors include tertiary butyl catechol, hydroquinone and fatty amine hydrochlorides. The latter compounds are disclosed and claimed as stabilizers for the monomer and polyester mixtures in the copending application of Preston and Zvejnieks, Serial No. 137,720, filed September 13, 1961.

A polymerization catalyst can be added to the unsaturated polyester or to the unsaturated polyester-monomer mixture just prior to application thereof to the primed metal substrate. A particularly suitable catalyst is methyl ethyl ketone peroxide. Other catalysts include benzoyl peroxide, tertiary butyl hydroperoxide, cyclohexyl hydroperoxide, acetyl peroxide, lauroyl peroxide, thioglycollic acid, amine-aldehyde condensation products and the like. Mixtures of such catalysts can be employed. Generally, the amount of catalyst will be in the range of about .01 to 5% by weight, based on the total composition.

The polyester coating composition may also include other well known addition agents such as polymerization accelerators, ultraviolet light absorbers, waxes, thixotropic agents, fillers and pigments. The accelerator can be an oil-soluble metallic salt of the kind commonly used as a catalyst in the hardening of drying oil films. Metallic compounds which are useful as accelerators include the salts of metals, such as cobalt, lead, manganese, iron, vanadium, copper and cerium, with acids such as napthenic, octoic, stearic, oleic, linoleic, myristic and other long chain fatty acids as well as aromatic, hydroaromatic, and alicyclic acids of sufficient carbon content to insure appropriate oil solubility. Other materials such as dimethylaniline also accelerate the polymerization and may be used in combination with a metallic salt such as cobalt octoate. The accelerator is incorporated into the base resin component in an amount of about 0.05 to 1.0% by weight.

The polyester coatings are rendered air-driable by the addition of a low melting point waxy substance in the base resin. Other than paraffin, natural and synthetic waxy materials having melting points in the range between about 90° F. and 180° F. may be used. Beeswax and ester waxes are exemplary materials. The wax is admixed and uniformly distributed through the base polyester composition in small amounts ranging from about 0.05 to 0.5% by weight.

Ultraviolet light absorbers are added, if desired, to inhibit discoloration of the surface coating due to exposure to light. Any of these well known compounds may be included. A preferred absorber is the material sold under the trademark "Permyl B-100" by Ferro Corporation. The ultraviolet light absorbers are generally used in amounts of about 0.1 to 2.5% by weight.

Thixotropic agents, such as a finely ground silica flour, available under the trademark "Cab-O-Sil" from Godfrey L. Cabot, Inc., can be included in the polyester compositions in amounts of 1 to 10% by weight. The resulting compositions are well adapted for application to vertical or overhead surfaces for the production of non-sagging coatings. Various other filler materials can be included to body the polyester compositions. Such materials include cellulose fibers, asbestos, glass fibers and fibrous silicate materials. A dispersing agent may be added to assist in maintaining the filler in suspension. Exemplary materials are the bentonite salts of quaternary ammonium compounds produced by the reaction of bentonite with organic bases. Such bentonite complexes are sold by the National Lead Company under the trade name "Bentone" with a numeral following the name and designating the number of carbon atoms in the quaternary compound from which the complex is derived. An exemplary quaternary ammonium bentonite complex is that sold under the designation "Bentone 38" which is dimethyl dioctadecyl ammonium bentonite. The filler and dispersing agent may be used in amounts of about 20 to 60% by weight and 0.5 to 2% by weight respectively.

Pigments may be added to either the epoxy resin-polyamide primer composition or to the polyester coating composition. In this way various effects can be achieved. Thus, a colored primer can be over-coated with a transparent polyester composition or the polyester composition can be colored. Any of a wide variety of pigments can be used in any concentration to produce the color desired. Representative pigments include cadmium sulfide, phthalocyanine blue and green, titanium dioxide, lamp black, carbon black, chromic oxide, calcium carbonate, toluidine red, red lead, red iron oxide and the like.

As set forth hereinabove, the primer is cured to the designated hardness and then coated with the polyester composition. The latter composition can be applied by the conventional procedures set forth above with respect to the primer. The polyester coating is then allowed to dry to give the article having good adhesion between the metal substrate, the epoxy-polyamide primer and the polyester coating.

The following examples serve to illustrate the present invention without, however, limiting the same thereto. In the examples, all parts are by weight unless otherwise indicated.

EXAMPLE I

An epoxy-resin-polyamide primer composition was prepared by adding 10.5 parts of a polyamide prepared from dimerized fatty acids, containing small amounts of monomer and trimer, and triethylene tetramine and 65 parts of an epoxy resin which was the condensation product of epichlorohydrin and Bisphenol A having an epoxy equivalent weight of about 525 to a solvent mixture of 44.5 parts xylene and 10 parts n-butanol. The polyamide had an amine value of 216 (the amine value is the milligrams of KOH equivalent to base content of one gram of resin as determined by HCl titration), viscosity at 75° C. of 35 poises, and a specific gravity at 25° C. of 0.99. The primer composition was allowed to remain at room temperature for a one-hour induction period and was then applied to aluminum panels (3 in. x 9 in x 0.025 in.) as a 1-2 mil film using a Boston-Bradley applicator. The coated panels were immediately subjected to an elevated temperature of 200° F. for curing. At curing intervals of 3, 5, 10, 15, 20, 25 and 30 minutes, one panel was withdrawn from the oven and allowed to cool to room temperature before measuring Sward Hardness of the films. The cooled panels were then over-coated with a pigmented, unsaturated polyester formulation prepared in the following manner:

A blend of 38 parts phthalic anhydride, 25 parts fumaric acid and 37 parts propylene glycol was heated in a stirred flask equipped with a thermometer, reflux condenser and water trap at 390° F. until an acid value of between 38 and 43 was reached. The reaction mixture was then cooled to 290° F. and 75 parts per million hydroquinone were added thereto. Forty-nine parts of the resin reaction product were then added to a warmed (140° F.) solution of 32 parts styrene monomer (containing 50 parts per million tertiary butyl catechol), 0.13 part of a solution of cobalt octoate in mineral spirits (6% metal), 0.26 part Ferro Permyl B-100 (ultraviolet light absorber), 0.07 part paraffin wax and 18 parts of 60% polyester pigment paste (pigment in an inert polyester vehicle). The mixture was agitated until solution was complete and then cooled. Two parts methyl ethyl ketone peroxide catalyst were added to the resulting solution just prior to the coating operation.

The above polyester formulation was applied to the primed aluminum panels as a 6-8 mil film with a brush. The coated panels were allowed to remain at room temperature for 5 days and then tested for adhesion between the films. The testing consisted of bending the panels over various sized mandrels and observing the adhesion of the primer to the aluminum substrate and to the polyester coating. The cure time of the primed panels, Sward Hardness of the primer film and adhesion of the polyester to primer are set forth in Table I.

*Table I*

| Panel | Cure Time (Min.) of Primer at 200° F. | Sward Hardness [1] of Primer | Adhesion of Polyester to Primer |
|---|---|---|---|
| 1 | 3 | Too low to be measured. | Materials did not cure.[2] |
| 2 | 5 | 38–40 | Excellent.[3] |
| 3 | 10 | 46–48 | Do. |
| 4 | 15 | 50–52 | Do. |
| 5 | 20 | 54–56 | Excellent-good.[4] |
| 6 | 25 | 58–60 | Poor.[5] |
| 7 | 30 | 60–62 | Very poor.[6] |

[1] Measured on manually operated Sward Hardness Rocker—Model C.
[2] A completely distorted coating due to the inability of the primer and polyester to cure properly. Incompatibility between primer and polyester.
[3] The primer showed excellent adhesion to both the aluminum substrate and the polyester coating.
[4] Slightly less adhesion between primer and polyester than when primer was cured to 38–52 Sward Hardness.
[5] Little adhesion evident between primer and polyester.
[6] Polyester had no more adhesion to primer than it normally has to unprimed aluminum.

EXAMPLE II

Example I was repeated except that a second polyester formulation was used in place of that of Example I. Said formulation was prepared in the following manner:

A blend of 31.5 parts isophthalic acid, 25.6 parts maleic anhydride, 6.2 parts ethylene glycol and 37.7 parts diethylene glycol was heated in a stirred flask equipped with a thermometer, reflux condenser and water trap at 450° F. until an acid value of between 15 and 20 was reached. The reaction mixture was then cooled to 350° F. and 175 parts per million hydroquinone were added thereto. The resin reaction product was further cooled to 245° F. and then 49.67 parts thereof were added, with stirring to a warmed (140° F.) solution of 33.1 parts styrene (containing 50 parts per million tertiary butyl catechol), 0.13 parts of a solution of cobalt octoate in mineral spirits (6% metal), 0.26 part Ferro Permyl B-100, 0.16 part dimethylaniline, 0.13 part paraffin wax and 16.55 parts of 60% polyester pigment paste (pigment in an inert polyester vehicle). Two parts methyl ethyl ketone peroxide catalyst were added to the resulting solution just prior to the coating operation.

Aluminum panels were primed and coated in the same way as in Example I. Test results were identical with those set forth in Table I.

EXAMPLE III

Example II was repeated except that steel panels (3 in. x 9 in. x 0.032 in. cold rolled steel) were substituted for the aluminum panels. Test results on the primed and coated steel panels were identical with those on the aluminum panels of Examples I and II.

As indicated previously, any of a wide variety of epoxy resin-polyamide primers and polyester coatings can be used in the method of my invention as long as the primer is cured to the specific enumerated hardness range. Likewise, the metal substrate can be aluminum, steel or other metal such as copper, bronze, tin and the like. And said substrate is not limited to metal sheets or panels but can be articles of any desired shape.

It is to be understood that the invention is not to be limited to the exact details of operation or the compositions, methods and articles shown and described, as obvious modifications will be apparent to those skilled in the art and the invention is to be limited only by the scope of the appended claims.

I claim:
1. A method of bonding a polyester coating to a metal substrate which comprises: (1) applying to the substrate, a primer comprising 10 to 90% by weight of an epoxy resinous material containing terminal epoxy groups and 90 to 10% by weight of a polymeric polyamide, said polyamide being the reaction product of polymeric fat acids containing at least 2 carboxyl groups and an aliphatic polyamine; (2) curing said primer to a Sward Hardness of 38–56; (3) applying to the primed substrate, a polyester coating comprising a polymerizable ethylenically unsaturated polyester; and (4) curing the composite coating.
2. A method according to claim 1 wherein the polyamide is prepared from triethylene tetramine.
3. A method according to claim 1 wherein the polymerizable ethylenically unsaturated polyester is prepared from a polyhydric alcohol, an ethylenically unsaturated dicarboxylic acid and a second dicarboxylic acid selected from the group consisting of saturated aliphatic acids and aromatic acids.
4. A coated article prepared by the method of claim 1.
5. A method according to claim 1 wherein the epoxy resinous material has an epoxy equivalent weight of from about 140 to about 2,000.
6. A method according to claim 5 wherein the epoxy resinous material is a reaction product of a polyhydric phenol and a polyfunctional halohydrin.
7. A method according to claim 1 wherein the polymerizable ethylenically unsaturated polyester is prepared from a polyhydric alcohol and an ethylenically unsaturated dicarboxylic acid.
8. A method according to claim 7 wherein the dicarboxylic acid is an alpha-beta ethylenically unsaturated alpha-beta dicarboxylic acid.
9. A method according to claim 7 wherein the polyhydric alcohol is a dihydric alcohol.
10. A method according to claim 1 wherein the polyester coating comprises a polymerizable ethylenically unsaturated polyester and a terminally ethylenically unsaturated copolymerizable monomer.
11. A method according to claim 10 wherein the monomer is styrene.

References Cited in the file of this patent
UNITED STATES PATENTS

| | | |
|---|---|---|
| 2,707,708 | Wittcoff | May 3, 1955 |
| 2,967,172 | Hood | Jan. 3, 1961 |
| 2,990,383 | Glaser | June 27, 1961 |
| 2,993,807 | Abbott et al. | July 25, 1961 |
| 3,008,848 | Annonio | Nov. 14, 1961 |
| 3,008,917 | Park et al. | Nov. 14, 1961 |
| 3,023,124 | Cryderman et al. | Feb. 27, 1962 |
| 3,042,545 | Kienle et al. | July 3, 1962 |
| 3,061,455 | Anthony | Oct. 30, 1962 |